UNITED STATES PATENT OFFICE.

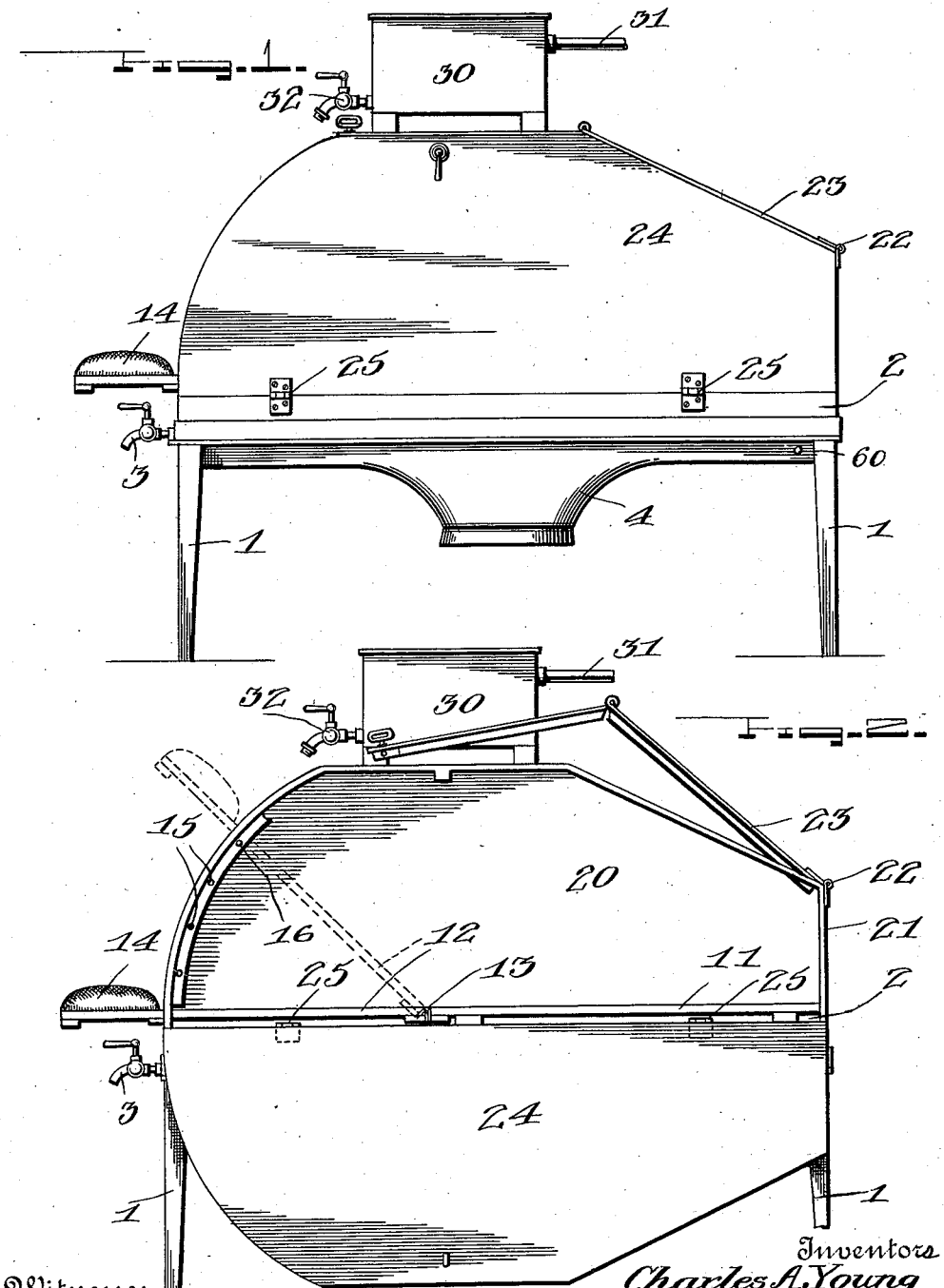

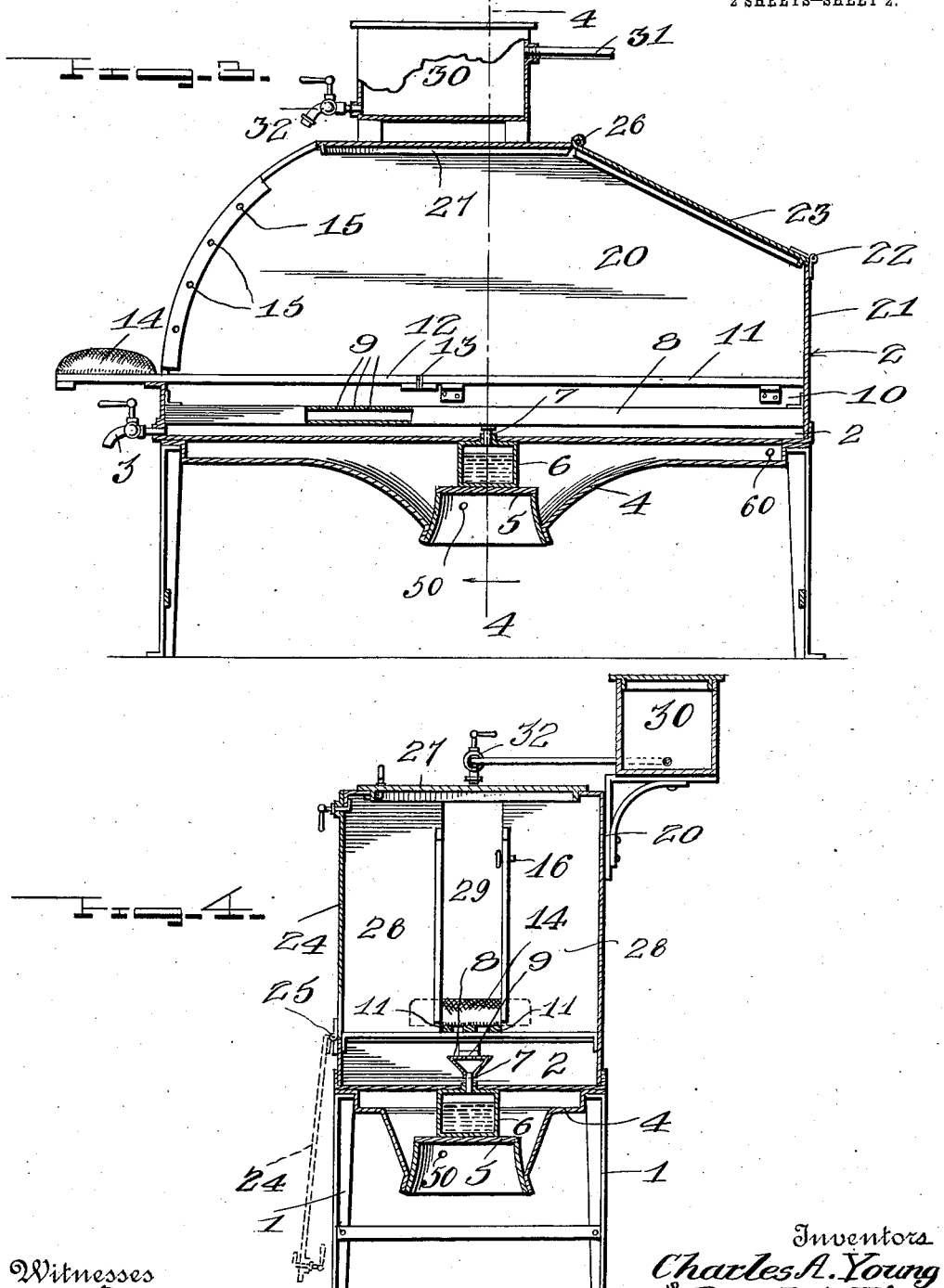

RUDOLPH FISHER AND CHARLES A. YOUNG, OF PORTLAND, OREGON.

BATH-CABINET.

1,014,587.　　　　　Specification of Letters Patent.　　Patented Jan. 9, 1912.

Application filed June 29, 1911.　Serial No. 635,980.

*To all whom it may concern:*

Be it known that we, RUDOLPH FISHER and CHARLES A. YOUNG, citizens of the United States, residing at Portland, in the county of Multnomah and State of Oregon, have invented certain new and useful Improvements in Bath-Cabinets; and we do declare the following to be a full, clear, and exact description of the invention, such as will enable others skilled in the art to which it appertains to make and use the same.

This invention relates to baths and closets and more especially to bathing apparatus for giving various kinds of baths; and the object of the same is to construct a simple and cheap cabinet of this character having possibilities for giving a luke-warm or steam bath and for later rinsing or spraying with water at a lower temperature.

This and other objects are accomplished by the construction hereinafter more fully described and claimed and as shown in the drawings wherein—

Figure 1 is a side elevation of the device complete; Fig. 2 is a similar view, with the doors swung open; Fig. 3 is a longitudinal sectional view; Fig. 4 is a transverse section on the line 4—4 of Fig. 3.

This improved bath cabinet comprises the heating mechanism, a bed above the same, and a body above the bed, and in our preferred form the body carries a superimposed tank for containing cooler water so that the user may be sprayed or showered after bathing.

Referring now to the drawings by reference numerals, 1 designates the legs supporting a pan 2 which is preferably of metal and rather shallow and may have an outlet faucet 3 for drawing off the water contained therein when desired. Beneath the pan may be disposed a metal shield 4 to retain the heat generated by a heater (gas or otherwise, not shown) which passes upward through a shell 5 at the center of the bottom of the shield and is applied directly beneath the bottom of a water boiler 6 supported on or over said shell, after heating which the products of combustion escape through holes 50 into the shield and heat the bottom of the entire pan 2 if desired and are passed off through exits 60 forming no material part of the present invention. From the top of the boiler 6 a pipe 7 leads upward through but out of communication with the pan 2, and into a diffuser which is here shown as a triangular steam pipe 8 extending throughout the length of the pan and having perforations 9 in its top. Hence the water is converted into steam within the boiler 6, and the steam rises through the pipe 7 and flows along the diffuser 8, passing out at perforations 9 and upward through the bed which we will next describe.

Supported by cross strips 10 within the pan is a bed comprising longitudinal slats whereof the body portions or halves are fixed as at 11 and the other portions or halves 12 are hinged as at 13 to said body portions, project through an opening 29 in the headboard and carry a head rest 14 which may be raised or lowered as indicated in the several positions shown in Fig. 2. Any suitable mechanism may be employed for holding the head-portion of the bed raised, such as holes 15 formed in a fixed portion of the body and a plug 16 adapted to be inserted into any of said holes as will be clear. It is obvious that the vapor and steam rising from the pipe 8 or pan 2 will pass between the slats and escape into the cabinet, whereas the water sprayed or sprinkled upon the user will pass downward between the slats into the pan and may be drawn off at 3.

The body of this improved cabinet comprises a fixed rear side 20 rising above the rear side strip 10 along the rear edge of pan 2, a fixed foot board 21, a fixed head board made in two panels 28 separated by an opening 29 as best seen in Fig. 4, a cover comprising a door 23 hinged at 22 to the foot board 21 and a top door 27 hinged at 26 to the free edge of the door 23, and a front side 24 hinged at 25 to the front side strip 10 so that it may be let down as shown in dotted lines in Fig. 4 and in full lines in Fig. 2. When so let down, whether the doors are or are not opened, it is obvious that the user may enter through the front side after which the doors are closed so as to retain as much of the vapor and steam as possible within the body while he is taking a vapor bath. For rinsing or showering purposes a tank 30 may be supported upon the fixed rear side 20 and can be filled with cold or luke-warm water through its top or through a supply pipe 31, its outlet being by way of a faucet 32 to which a hose may be attached and the hose may carry a suitable nozzle so that the attendant may direct the shower upon the user.

With the above construction of parts, the use of this improved bath cabinet is as follows: The front side 24 and the door 23 having been opened, the user enters the body and these hinged parts are closed. A certain amount of water having first been put into the boiler 6, the heater (not shown) is placed beneath the shell 5 and heat is sent through it and heats the bottom of the boiler and also passes through the holes 50 and heats the space within the shield 4 and hence the bottom of the pan 2. Steam rising from the water in the boiler 6, ascends through the pipe 7 and passes into the steam pipe 8, whence it issues through the perforations 9 and passes upward through the slats on which the user lies. It is obvious that by controlling the heat and by supplying more water to the boiler 6 when that first put therein has been converted into steam and used, the bath may be continued as long as desired. It is also obvious that if the heat be still further increased, its passage through the shield 4 beneath the pan 2 to the exits 60 may be made to heat the water within the pan to such an extent that it will be converted into steam, and that also will rise through the slats on which the user lies. Ordinarily, however, the function of the pan 2 is to collect the water which condenses within the cabinet or which is sprayed upon the patient. Any kind of water may be used, natural or mineral, and to it may be added such medicaments as desired. The steam and vapor ascending through the slats, surrounds the user and escapes out the opening 29. This step may be continued as long as desired, and afterward if it is desired to spray the user with lukewarm or cold water, treated with medicaments or not as preferred, the same is placed within the tank 30 and permitted to flow out of the faucet 32 through a hose (not shown) having a nozzle by means of which it is directed onto and over the user, and the water falling into the pan 2 may be drawn off at 3. Obviously the heat may be left turned on wholly or partly during this operation, or not as preferred; and obviously the water in the tank 30 may be used for bathing or rinsing whether the steam be employed or not. Finally the user emerges from the body by opening one or both the doors in a manner which will be clear.

We do not confine ourselves to the details of construction or to the proportions and materials of parts.

What is claimed as new is:

1. In a bath cabinet, the combination with a slatted bed, and a body rising above the same and having folding doors; of a tank carried by the upper portion of the body for containing a cooling liquid to be sprayed upon the patient, a pan extending below and co-extensive with said bed, steam generating mechanism located below said pan, a shield inclosing said mechanism and disposed immediately below said pan, a perforated pipe located within but out of communication with said pan, and a pipe connecting the perforated pipe with the steam generator and leading through but out of communication with the pan.

2. In a bath cabinet, the combination with a slatted bed, and a body rising above the same and having folding doors; of a tank carried by the upper portion of the body for containing a cooling liquid to be sprayed upon the patient, a pan extending below and co-extensive with said bed, an outlet from said pan, a water boiler located beneath and in contact with the bottom of the pan but out of communication with it, a perforated pipe between the pan and bed bottom, and connections between said boiler and pipe.

3. In a bath cabinet, the combination with a slatted bed, and a body rising above the same and having folding doors; of a tank carried by the upper portion of the body for containing a cooling liquid to be sprayed upon the patient, a pan extending below and co-extensive with said bed, an outlet from said pan, a water boiler located beneath and in contact with the bottom of the pan but out of communication with it, a perforated pipe between the pan and bed bottom, connections between said boiler and pipe, a heat collecting shell beneath said boiler and having outlets, and a shield surrounding the shell and extending to the edges of the pan and itself having heat exits.

4. In a bath cabinet, the combination with a slatted bed, and a body surrounding it and having folding doors; of a pan extending beneath and co-extensive with said bed and having an outlet, a triangular pipe located within but out of communication with said pan and having perforations in its upper side beneath said bed, a boiler located beneath and in contact with the bottom of the pan and connected with the interior of said perforated pipe, and means for directing the heat to the bottom of the boiler and to the bottom of the pan.

5. In a bath cabinet, the combination with a slatted bed, and a body surrounding it and having folding doors; of a pan extending beneath and co-extensive with said bed and having an outlet, a triangular pipe located within but out of communication with said pan and having perforations in its upper side beneath said bed, a boiler located beneath and in contact with the bottom of the pan and connected with the interior of said perforated pipe, a shell beneath the boiler, and a shield surrounding the shell and coextensive with the pan, the shell having heat-openings into the shield and the shield having heat-exits around its edges.

In testimony whereof we have hereunto set our hands in presence of two subscribing witnesses.

RUDOLPH FISHER.
CHARLES A. YOUNG.

Witnesses:
R. J. LOCKWOOD,
EARL R. CARPENTER.